United States Patent [19]

Hühne

[11] 3,964,307

[45] June 22, 1976

[54] VARIOMETER COMPRISING A MEASURING BOX

[75] Inventor: Dirk Hühne, Frenkendorf, Switzerland

[73] Assignee: Revue Thommen AG, Switzerland

[22] Filed: May 28, 1975

[21] Appl. No.: 581,479

[30] Foreign Application Priority Data

Dec. 30, 1974 Switzerland.................. 17362/74

[52] U.S. Cl. ............................................... 73/179
[51] Int. Cl.²...................................... G01C 21/00
[58] Field of Search................... 73/179; 340/27 NA

[56] References Cited
UNITED STATES PATENTS 2,309,400  1/1943  Kollsman ............................ 73/179

*Primary Examiner*—Donald O. Woodiel
*Attorney, Agent, or Firm*—McGlew and Tuttle

[57] ABSTRACT

The variometer includes a measuring chamber communicating with the atmosphere through a first passageway and an elastically deformable measuring box, positioned within the measuring chamber, communicating with the atmosphere through a second passageway. One of the passageways, preferably the second passageway, is provided with a system of orifice inserts serving to delay pressure equalization between the measuring chamber and the measuring box. The system of orifice inserts includes at least two orifice inserts with successive orifice inserts being separated from each other by an intermediate space. The orifice inserts are threaded into the internally threaded bore of a hollow screw, and preferably three orifice inserts are provided so as to define two intermediate spaces. At least one of the orifice inserts is displaceable axially of the hollow screw, and preferably two orifice inserts are so displaceable. Each orifice insert is a hollow externally threaded member in which the orifice is formed in a bore through a jewel or the like at one end of the orifice insert.

7 Claims, 5 Drawing Figures

VARIOMETER COMPRISING A MEASURING BOX

FIELD AND BACKGROUND OF THE INVENTION

Variometers are used in airplanes for measuring the climbing and descending speeds. In their known various designs, they comprise a measuring chamber communicating with the atmosphere and a tight measuring box located within the chamber and also communicating with the atmosphere. The measuring box is connected, through a lever system, to a pointer and is elastically deformable in a manner such that pressure differences occurring between the interior of the measuring box and the space surrounding it, i.e. the interior of the measuring chamber, effect a deflection of the pointer.

The basic idea underlying such an arrangement is to establish a communication with the atmosphere, of either the measuring box or the measuring chamber, not directly but through a retardation member. The result is that the variations of the atmospheric pressure due to the varying flight altitude cause a pressure differential between the measuring box and the measuring chamber, which is taken as a measure of the climbing or descending speed.

In the older known designs, the measuring chamber is connected to the atmosphere directly while the measuring box is connected through a retardation member. In such a design, it is not necessary to seal the measuring chamber nor the indicating mechanism mounted therein against the outside. However, to obtain a satisfactory time constant of the time delay, an equalizing receptacle is needed which is connected to the measuring box and occupies a relatively large space.

In the more recent known designs, on the contrary, the retardation member is mounted upstream of the measuring chamber while the measuring box is connected to the atmosphere directly, through a line having a very small flow resistance. In this design, of course, except for the passage formed by the retardation member, the interior of the measuring chamber must be hermetically sealed relative to the outside.

In one of the known designs, a ceramic plate having through pores is used as the retardation member. For calibrating the variometer, prior to the final assemblage, first a static calibration is performed during which definite pressure differences are produced between the measuring box interior and its exterior. Thereupon, the lever system, serving to transmit the deformation of the measuring box to the pointer, is adjusted so that, at each of the produced differential pressures, a definite, altitude-change speed corresponding thereto is indicated. Following this static calibration, the measuring chamber of the variometer is closed and the variometer is brought into a test chamber for dynamic calibration, and in which test chamber the internal pressure can be varied for simulating changes in altitude. If, now, the variometer indicates incorrect climbing and descending speeds, the flow resistance of the retardation member must be correspondingly changed to obtain the differential pressure provided for the respective rate of climb or descent. In case the flow resistance is too small, a part of the ceramic plate must be covered with varnish to close a part of the pores. On the other hand, should the flow resistance be too high, the ceramic plate must be replaced. Since the ceramic plate is not accessible from the outside of the measuring chamber, the measuring chamber must be opened for each test. It is usual that the flow resistance must be changed several times to obtain the correct indication, so that a calibration of such variometers takes a very considerable time.

In another known design, a system of orifices is used as the retardation member, comprising a plurality of orifice inserts which are disposed one after the other and each provided with a bore. Then, if the time of retardation is to be reduced during the calibration, this may be done by enlarging the bore in the first orifice insert. If, on the contrary, the time of retardation is to be increased, one of the orifice inserts must be replaced by another having a smaller bore. Therefore, in this design again, the calibration is very time-consuming.

SUMMARY OF THE INVENTION

The present invention is directed to a variometer comprising a retardation member in which the retardation, i.e. the delay with which the variations of the atmospheric pressure are transmitted to the measuring box, can be varied continuously and reversibly.

A variometer embodying the invention comprises a measuring chamber communicating with the atmosphere through a first passageway, an elastically deformable measuring box located within the measuring chamber and also communicating with the atmosphere, through a second passageway, and a system of orifice inserts mounted in one of the two passageways and serving to slow down the pressure equalization and comprising at least two orifice inserts separated from each other by an intermediate space. In accordance with the invention, at least one of the orifice inserts is displaceable so as to vary the volume of one of the intermediate spaces.

An object of the invention is to provide a variometer in which the retardation time can be adjusted simply and easily.

Another object of the invention is to provide such a variometer in which the retardation time can be adjusted by varying the axial distance between successive orifice members separated by an intermediate space, with the variation being capable of performance from the exterior of the measuring chamber.

A further object of the invention is to provide such a variometer including three successive orifice inserts of which two are axially adjustable whereby to vary the length of the intermediate spaces between the three orifice inserts.

For an understanding of the principles of the invention, reference is made to the following description of a typical embodiment thereof as illustrated in the accompanying drawings.

DESCRIPTION OF THE PREFERRED EMBODIMENT

Figure 1:
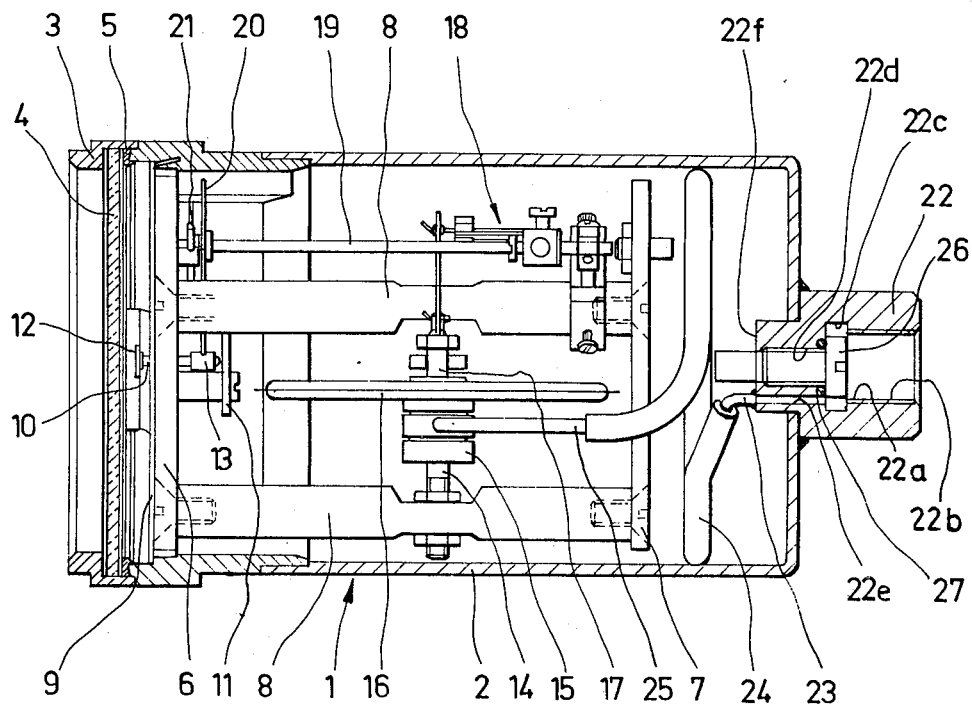
FIG. 1 is a partly axially sectioned view of a variometer embodying the invention, showing the most important parts of the measuring mechanism.
Figure 2:
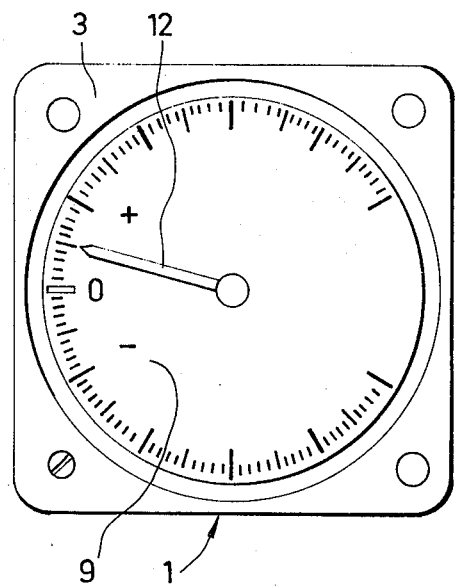
FIG. 2 is a front elevation view of the variometer.

The variometer shown in FIG. 1 and 2 comprises a measuring chamber generally designated 1. The measuring chamber is formed by a metal housing 2 and a glass plate 4 which closes the housing at the front side and is fixed by means of a flange 3 screwed to housing 2. The joint between housing 2 and glass plate 4 is sealed by means of a gasket 5.

Measuring chamber 1 accommodates a supporting structure fixed thereto and comprising two disks 6 and 7 interconnected by three supports 8. A graduated dial 9 is secured to disk 6. In the center of disk 6, a pointer shaft 10 is rotatably mounted and, additionally, supported by means of an abutment or the like 11. Pointer shaft 10 carries, at one end, the pointer 12 and, on the other end, a pinion 13.

By means of a threaded bolt 14, a bushing 15 is secured to the lower support 8 and connected to one shell of an elastically deformable, fluid-tight measuring box 16. To the other shell of measuring box 16, a pin 17 is secured and is connected, through a lever system generally designated 18, to a shaft 19. Shaft 19 carries an element 20 in the shape of a circular sector gear which, on its arcuate periphery, is provided with teeth engaging the teeth of pinion 13. Shaft 19 is further engaged with the end of a return spring 21 the other end of which is connected to a pin provided on disk 6.

A bush 22 provided with a stepped central bore 22a is tightly welded or otherwise secured into the back wall of housing 2. Bore 22a includes a wider outside threaded portion 22b, a narrower inside threaded portion 22d, and a groove 22c separating the two threaded portions. Further, bust 22 is provided with an eccentric bore 22e extending between the inside end xurface 22f of bush 22 and groove 22c.

A connection piece 23, communicating with the orifice of bore 22e, is tightly secured to the inside end surface 22f. Connection piece 23 is connected, by means of a flexible tube 24, to a connection tube 25 communicating with the interior of measuring box 16.

Figure 3:
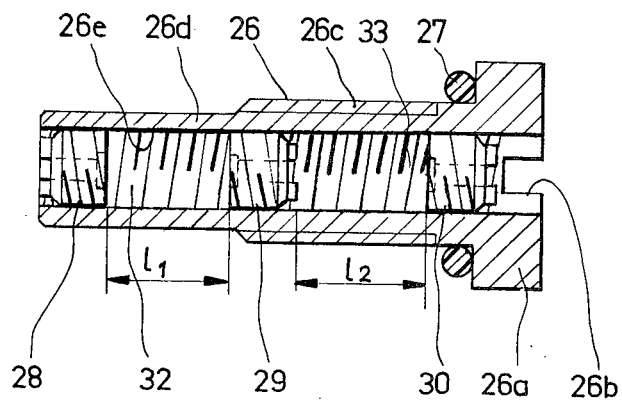
FIG. 3 is an enlarged axial sectional view of the system of orifice inserts serving as the retardation member.

A tubular screw 26 is screwed into the internally tapped hole 22d of bush 22 and sealed by means of an O-ring 27. Screw 26 and O-ring 27 are shown in FIG. 3 in an enlarged view. Tubular screw 26 comprises a heat 26a which is provided with a slot 26b. Head 26a is followed by a cylindrical portion 26c carrying the O-ring 27 and provided with an external thread extending up to a location close to the O-ring. The free end of screw 26 has the form of a tubular shaft 26d and has a diameter which is slightly smaller than the thread root diameter of portion 26c. The cavity of hollow screw 26 is formed by an internally threaded through bore 26e.

Three threaded plugs 28, 29 and 30 are screwed into threaded hole 26e so that they are spaced axially from each other by intermediate spaces. The length of the intermediate space 32 between plug 28 received at the side of hollow screw 26 turned to the measuring chamber and middle plug 29 is designated $1_1$. The length of the intermediate space 33 between middle plug 29 and plug 30, which is received in the outer end portion of screw 26 is designated $1_2$.

Figure 4:
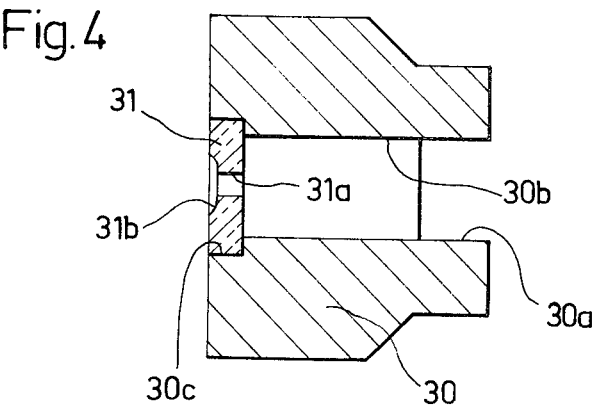
FIG. 4 is a further enlarged axial sectional view of an orifice insert of the orifice system.

One of the three plugs 28, 29, 30, namely plug 30, is shown in FIG. 4 in an enlarged view. On one of its ends, it is provided with a transverse slot 30a. Further, it is provided with a coaxial through bore 30b which is enlarged, at the side remote from slot 30a, to a widened portion 30c. In this enlarged portion 30c, a bored jewel 31, i.e. an artificial ruby or sapphire provided with a through bore 31a, is received having its hole or bore enlarged, at the inside end, by a flaring 31b.

Plug 30 is screwed into hollow screw 26 so that its slot 30a is turned to the free outside. The two other plugs 28 and 29 have the same shape as plug 30. Plug 29 is again screwed into bore 26e so that its slot is turned to the free outside. By contrast, plug 28 is screwed so that its slot is turned to the interior of the measuring chamber.

When mounting the variometer into the airplane, bush 22 is being connected, through a line screwed into threaded hole 22b, to the atmosphere. At the same time, the free orifice of this line is mounted so as to permit the measuring of the static air pressure independent of the speed of the airplane. Threaded hole 22b and threaded hole 26e form together a first passageway 22b, 26e through which communication is established between the interior of measuring chamber 1 and the atmosphere. Each of the three threaded plugs 28, 29, 30 acts as a throttling insert having an orifice formed by the bore 31a of the jewel 31 fixed therein. It is evident that both the internal thread of bore 26e and the external threads of plugs 28, 29, 30 must be machined with sufficient precision so as to form together a close-to-tight closure.

Threaded hole 22b, eccentric bore 22e, connection 23 and flexible tube 24 together form a second passageway 22b, 22e, 23, 24 establishing communication between measuring box 16 and the atmosphere.

The orifice system formed by the three orifice inserts 28, 29, 30 offers a relatively high flow resistance. As soon as, due to a change of altitude of the airplane, the air pressure changes, the high flow resistance of the first passageway 22b, 22e causes a slowing down of the pressure equalization between the atmosphere and measuring chamber 1, while, in measuring box 16, the pressure follows the outside pressure variation practically without delay. Thereby, pressure differentials are produced between the interiors of measuring box 16 and measuring chamber 1, resulting in a deformation of measuring box 16 and, consequently, in a deflection of pointer 12.

The size of the throttling orifices must be adjusted, of course, to the volumes of measuring box 16 and measuring chamber 1, as well as to the provided measuring range. It has been found advantageous to use bored jewels having bores of about 0.15 to 0.25 mm in diameter. However, the retardation of the pressure equalization depends not only on the size of the throttling orifices but also on the volume of the two intermediate spaces 32, 33 between the three orifice inserts 28, 29, 30. That is, at an occurring change of the outside pressure, the intermediate spaces 32, 33 must first take in or give off air before the measuring box pressure can be equalized. Thus, orifices 28, 29, 30 and intermediate spaces 32, 33 act in a manner similar to an electric delay network formed by chokes and capacitors.

In consequence, it is possible to vary the retardation of the pressure equalization by varying the volume of the intermediate spaces 32, 33. Since the outermost plug 30 can be axially displaced by means of a suitable screwdriver from the outside and, thereby, the volume of intermediate space 33 can be changed, the invention makes it possible to vary the retardation of the pressure equalization without difficulties in an already finally assembled variometer.

To calibrate the variometer, first, i.e., prior to the mounting into housing 2, a static calibration is performed. In this static calibration, as mentioned in the beginning, definite pressure differences constant in time are produced between the measuring box and the outside space. Thereupon, the lever system 18 is adjusted by means of different adjustment members so as to obtain pointer deflections corresponding to the pressure differences. During the static calibration, in addition, the temperature of the variometer may be varied and the incorrectness caused thereby can largely compensated by means of an adjustable bimetal element acting on the measuring box 16 or on the lever system 18.

The static calibration once terminated, the measuring mechanism is placed and secured in housing 2 and measuring chamber 1 is tightly closed. Then, it is possible to proceed with the dynamic calibration. For this purpose, variometer is brought into a calibration chamber in which the pressure is variable in time, or bush 22 is connected, through a line, to a suitable pressure control device. Then, by varying the pressure with time, variations in the flight altitude can be simulated and the variometer can be dynamically calibrated by changing the time of retardation. Generally, it will be sufficient for the calibration to vary only the volume of the axially outer intermediate space 33. Should relatively large corrections be necessary, outermost orifice insert 30 may be completely unscrewed so that middle orifice insert 29 can also be displaced from the outside. Then, the outermost insert can be put in place again and correspondingly adjusted. In this manner, it is possible to calibrate the variometer dynamically from the outside.

In considering results of measurements shown in FIG. 5, the effect of the displacement of orifice inserts will be explained as follows:

In the course of these measurements, the distance $l_1$ and $l_2$ between the orifice inserts have been increased gradually, by the same value, from 0 to 4 mm. On the x-axis of the diagram of FIG. 5, the length $l$ is plotted corresponding to the distance $l_1$ and $l_2$ between the orifice inserts in $mm$. On the y-axis, the value $\Delta v$ in $m/s$ is plotted corresponding to the difference between the actual magnitude of the vertical speed, or altitude change, and the indicated magnitude of the speed. For the shown measurements, climbing speeds of about 5 $m/s$ have been simulated by pressure variations in time. The curve 34 represents test readings in a pressure range corresponding to a flight altitude between 0 and 1800 m. Measurements with other climbing as well as descending speeds have resulted in qualitatively similar curves. If the value of $\Delta v$ is expressed as a percentage of the simulated speed, approximately the same values are obtained throughout for all climbing and descending speeds.

In a middle position of the orifice insert, i.e. in the present example, with distances of 2 mm between the orifice inserts, the error of measurement disappears. If now the lengths $l_1$ and $l_2$ are reduced, the intermediate spaces 32 and 33 become smaller. Consequently, the lag of the pressure in the measuring chamber behind the variations of the atmospheric pressure is also reduced. Therefore, the difference between the pressure in the measuring box 16 and the pressure in the measuring chamber 1 becomes smaller so that a too low climbing speed is indicated. This corresponds to an increase of the value of $\Delta v$. Inversely, of course, with an increased distance between the orifice inserts, a decrease of the value of $\Delta v$ is obtained.

Since the atmospheric pressure decreases with the altitude approximately exponentially, with a constant climbing speed, the pressure decrease in time decreases with the increasing altitude. It must therefore be expected that the differential pressure between the measuring box and the measuring chamber will also decrease with the increasing altitude so that a too low climbing speed will be indicated resulting in a positive value of $\Delta v$.

In the various known variometers, relatively complicated compensation devices must be provided for the correction of these errors. It has now been found that, with an appropriate dimensioning of the system of orifice inserts and of the bore 26e, a relatively satisfactory accuracy can already be obtained without any additional compensation device. Further, it has proved advantageous to design the intermediate spaces between the orifice inserts not with a smooth surface but with a profiled surface and, for example, as in the present embodiment, to provide the walls with a thread.

Figure 5:
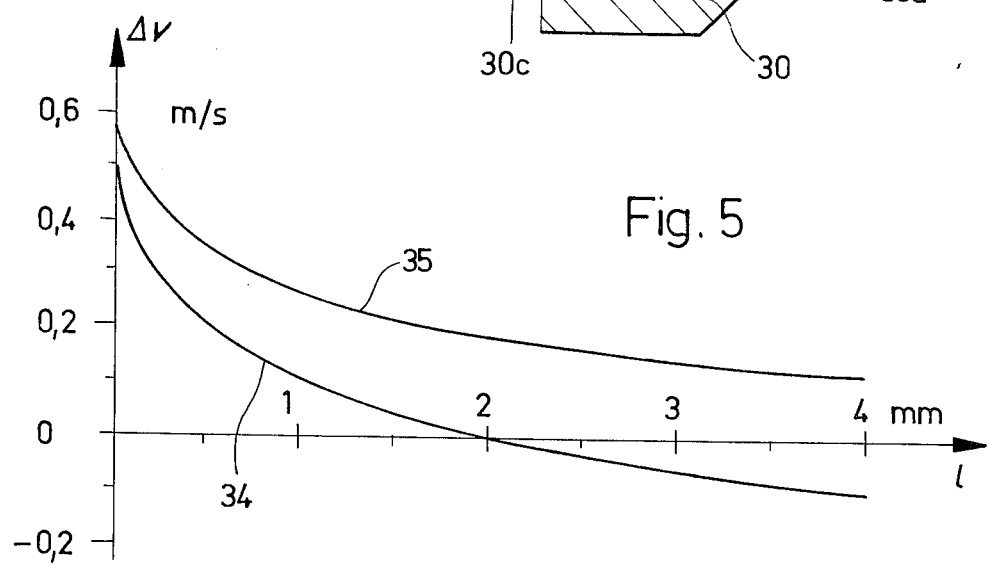
FIG. 5 is a diagram showing the dependence of the indication error on the adjustment of the orifice insert.

The curve 35 in FIG. 5 shows the test readings obtained at air pressures corresponding to flight altitudes of about 8500 to 10,000 m.

The reason for the fact that the indication thus obtained is, in a relatively satisfactory manner, independent of the altitude, is perhaps due to the circumstance that the thread favors the formation of turbulence and that the flow within the system of orifice inserts is a transitional motion intermediate laminar and turbulent flow.

As a matter of course, the variometer may be modified in various directions. For example, it is evident that only two orifice inserts may be provided which, in such a case, enclose a single intermediate space. Also, the orifice inserts might be fixed without a possiblility of displacement and, instead, a separate displaceable element may be provided for the variation of the volume of the intermediate space between the inserts.

While a specific embodiment of the invention has been shown and described in detail to illustrate the application of the principles of the invention, it will be understood that the invention may be embodied otherwise without departing from such principles.

What is claimed is:

1. In a variometer including a measuring chamber communicating with the atmosphere through a first passageway and an elastically deformable measuring box, positioned within the measuring chamber, communicating with the atmosphere through a second passageway, with one of the passageways being provided with a system of orifice inserts serving to delay the pressure equalization between the measuring chamber and the measuring box, the system of orifice inserts including at least two orifice inserts with successive orifice inserts being separated from each other by an intermediate space, the improvement comprising, in combination, at least one of said orifice inserts being displaceable to vary the volume of one of said intermediate spaces.

2. In a variometer, the improvement claimed in claim 1, in which said orifice inserts are arranged coaxially in succession, at least one orifice insert being displaceable in the axial direction.

3. In a variometer, the improvement claimed in claim 1, including three orifice inserts of which at least two are displaceable.

4. In a variometer, the improvement claimed in claim 3, in which that portion of the passageway provided with a system of orifice inserts is in the form of an internally threaded bore; each displaceable orifice insert being formed with an external thread and meshing with the internal thread of said internally threaded bore.

5. In a variometer, the improvement claimed in claim 1, in which each orifice insert is in the form of a tubular member having, at one end, a bored jewel whose bore forms the orifice of the associated orifice insert.

6. In a variometer, the improvement claimed in claim 1, in which each intermediate space has a roughened interior surface to favor the formation of turbulence.

7. In a variometer, the improvement claimed in claim 1, in which said system of orifice inserts is provided in said first passageway.

* * * * *